(12) United States Patent
Priser et al.

(10) Patent No.: US 11,982,591 B2
(45) Date of Patent: May 14, 2024

(54) TIGHTNESS TESTING SYSTEM FOR A CABLE GLAND FEED-THROUGH OF A PARTITION

(71) Applicant: NAVAL ENERGIES, Paris (FR)

(72) Inventors: Mathieu Priser, Paris (FR); Alexander Chiffoleau, Paris (FR); Jean-Christophe Bourget, Paris (FR)

(73) Assignee: NAVAL ENERGIES, Paris (FR)

(*) Notice: Subject to any disclaimer, the term of this patent is extended or adjusted under 35 U.S.C. 154(b) by 535 days.

(21) Appl. No.: 17/276,590

(22) PCT Filed: Sep. 16, 2019

(86) PCT No.: PCT/EP2019/074605
§ 371 (c)(1),
(2) Date: Mar. 16, 2021

(87) PCT Pub. No.: WO2020/058148
PCT Pub. Date: Mar. 26, 2020

(65) Prior Publication Data
US 2022/0042874 A1 Feb. 10, 2022

(30) Foreign Application Priority Data
Sep. 17, 2018 (FR) ...................................... 18 58364

(51) Int. Cl.
*G01M 3/28* (2006.01)
*G01M 13/005* (2019.01)
*H01R 13/52* (2006.01)

(52) U.S. Cl.
CPC ........ *G01M 3/2838* (2013.01); *G01M 13/005* (2013.01); *H01R 13/5205* (2013.01)

(58) Field of Classification Search
CPC .............. G01M 3/2838; G01M 13/005; H01R 13/5205
See application file for complete search history.

(56) References Cited

U.S. PATENT DOCUMENTS

| 2,936,187 A | 5/1960 | Peterson |
| 3,741,568 A * | 6/1973 | Rhoades ................. F16J 15/40 |
| | | 277/332 |

(Continued)

FOREIGN PATENT DOCUMENTS

| DE | 297 12 576 | 9/1997 |
| FR | 1176294 | 4/1959 |

(Continued)

OTHER PUBLICATIONS

International Search Report for PCT/EP2019/074605, dated Oct. 21, 2019, 5 pages.

(Continued)

*Primary Examiner* — Eric S. McCall
(74) *Attorney, Agent, or Firm* — NIXON & VANDERHYE

(57) ABSTRACT

Disclosed is a system for testing the tightness of a cable gland feed-through of a partition, in particular of an immersible electrical connector, of the type including a cable gland body in which a seal and a cable gland rammer for compressing the seal are placed, characterized in that it includes a tightness testing ring inserted in the seal and provided with a bore opposite a hole of the cable gland body opening on same, and provided with a connection to a pressure/vacuum source for testing the tightness of the cable gland.

20 Claims, 2 Drawing Sheets

(56) References Cited

U.S. PATENT DOCUMENTS

| | | | |
|---|---|---|---|
| 3,907,307 A | | 9/1975 | Maurer et al. |
| 4,741,199 A | * | 5/1988 | Spencer ................. F16J 15/004 277/606 |
| 6,394,464 B1 | | 5/2002 | Moreau |
| 2023/0073865 A1 | * | 3/2023 | Wang ........................ H01T 4/02 |

FOREIGN PATENT DOCUMENTS

| | | |
|---|---|---|
| GB | 2 143 596 | 2/1985 |
| JP | 2010-501813 A | 1/2010 |
| WO | 2016/128506 A1 | 8/2016 |

OTHER PUBLICATIONS

Written Opinion of the ISA for PCT/EP2019/074605, dated Oct. 21, 2019, 5 pages.

* cited by examiner ic # TIGHTNESS TESTING SYSTEM FOR A CABLE GLAND FEED-THROUGH OF A PARTITION This application is the U.S. national phase of International Application No. PCT/EP2019/074605 filed 16 Sep. 2019, which designated the U.S. and claims priority to FR Patent Application No. 18 58364 filed 17 Sep. 2018, the entire contents of each of which are hereby incorporated by reference.

BACKGROUND OF THE INVENTION

Field of the Invention

The present invention relates to a system for testing the tightness of a cable gland feed-through of a partition, such as an immersible electrical connector.

DESCRIPTION OF THE RELATED ART

Sealing means are known generally for these applications, from documents FR 1 176 294 and U.S. Pat. No. 3,907,307, for example.

More specifically, FR 1 176 294 relates to a device for indicating and measuring the quantity of a fluid passing through a cable gland and U.S. Pat. No. 3,907,307 relates to sealing means into which a lubricant is injected through a passage by a pump.

Such connectors may be constituted by connectors commonly referred to as "DRYM connectors", for example.

Such connectors are used, for example, to connect offshore wind turbines to an electricity distribution network.

Of course, other uses of these connectors can be envisaged.

In particular, this type of connector comprises a partition for the passage of elongated elements such as cables, fibers or others, the sealing of which is ensured by a gland.

The connector thus comprises a cable gland body in which sealing means are placed and a cable gland rammer enabling these sealing means to be compressed around the body passing through the partition, in order to obtain the tightness desired.

Nowadays, the tightness of the sealing means assembly and of the cable gland(s) of such connectors is checked, for example, by using a helium tightness test.

For this purpose, the connector's sealed enclosure is evacuated, then helium is sprayed on the areas to be inspected, and finally the tightness rate is analyzed by mass spectrometry.

Such a method requires extremely heavy equipment that must be handled by highly qualified operators.

As each connector must be checked individually, these operations also show a significant cost and additional time in the connector qualification process.

SUMMARY OF THE INVENTION

The object of the invention is therefore to solve these problems by providing a testing system that is reliable, easy and quick to implement and inexpensive in terms of money and time.

To this end, the object of the invention is a tightness testing system for a cable gland feed-through of a partition, in particular of an immersible electrical connector, of the type comprising a cable gland body in which sealing means and a cable gland rammer for compressing the sealing means are placed for compressing the sealing means, characterized in that it comprises a tightness testing ring inserted in the sealing means and provided with a hole opposite a hole in the gland body opening same and provided with connection means to a pressure/vacuum source for testing the tightness of the cable gland.

According to other features of the system according to the invention, taken alone or in combination:

the sealing means have the shape of a deformable sleeve;
the sealing means comprise a stack of V-shaped annular seals mounted head to tail and in that the test ring is inserted into this stack of annular seals;
the hole of the cable gland body opens transversely on the latter;
the hole in the cable gland body comprises a connection at its end;
the testing ring is a metal ring.

BRIEF DESCRIPTION OF THE DRAWINGS

The invention will be better understood upon reading the following description, given solely by way of example, and made with reference to the appended drawings, in which.

DESCRIPTION OF THE PREFERRED EMBODIMENTS

These figures illustrate a tightness testing system for a cable gland feed-through of a partition, such as an immersible electrical connector.

Figure 1:
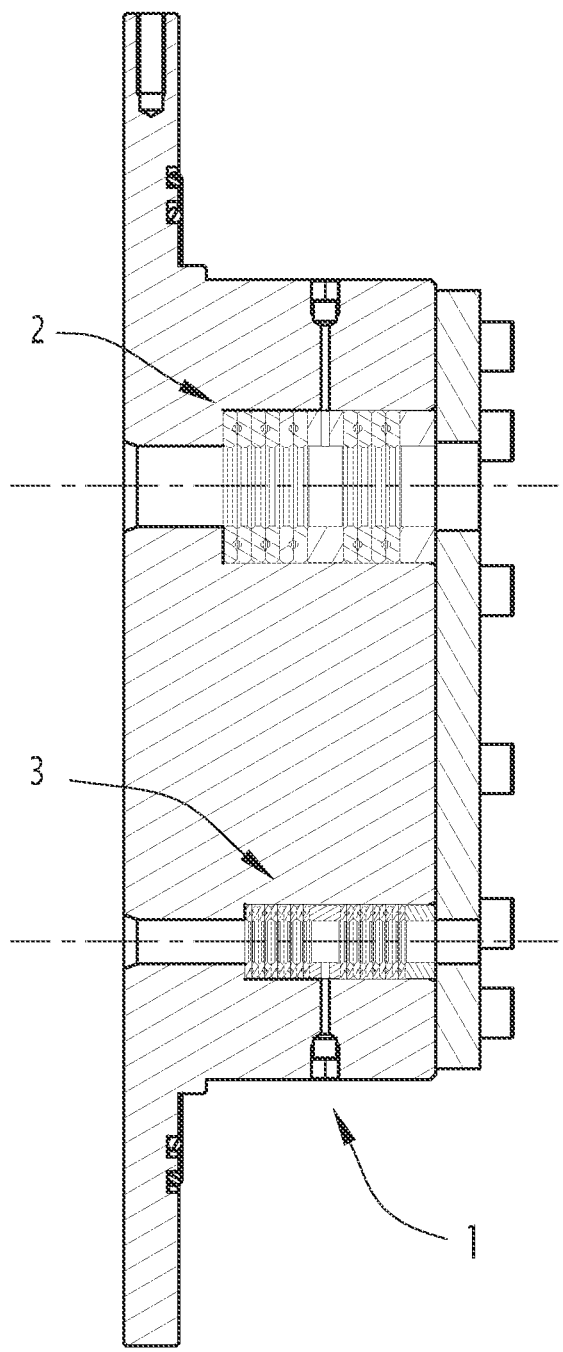
FIG. 1 shows a side sectional view of a partition, in particular of an immersible electrical connector equipped with a tightness testing system according to the invention.

This partition is designated for example by the general reference 1 on these figures and in particular on FIG. 1.

For clarity, the rest of the connector is not shown in these figures.

The partition is provided with at least one waterproof cable gland feed-through of one or more elongated bodies, such as electrical cables, fibers or the like.

In the example, two cable glands are illustrated in this FIG. 1 and are designated by references 2 and 3.

Figure 2:
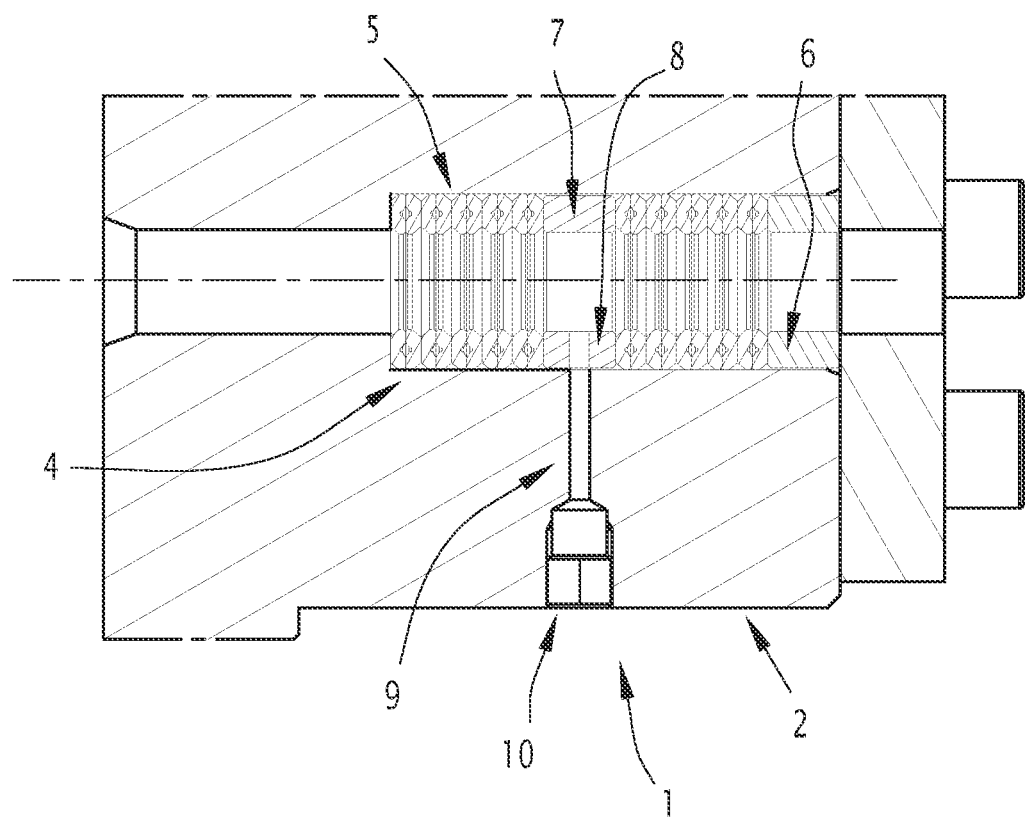
FIG. 2 shows an enlarged scale view of a part of this partition.

In effect, the or each cable gland in the partition then comprises a cable gland body, designated by reference 4 in FIG. 2 for cable gland 2, in which sealing means designated by general reference 5 are placed.

These sealing means have the general shape of a deformable sleeve comprising, for example, a stack of V-shaped annular seals, mounted head to tail, one after the other.

The cable gland, for example 2, also includes a cable gland rammer designated by general reference 6 in this FIG. 2, allowing the sealing means to be compressed around the body passing through the partition, in order to ensure the tightness of this passage.

Figure 3:
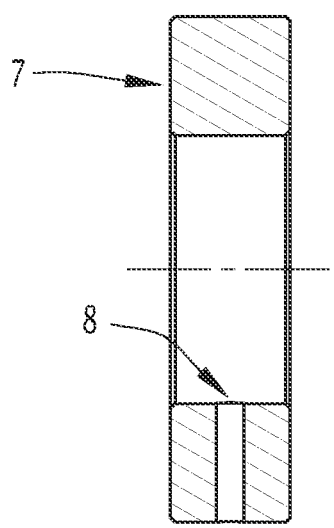
FIG. 3 shows a cross-sectional view of a test ring forming part of a system according to the invention.

As shown in particular in these FIGS. 2 and 3, the test system according to the invention comprises a tightness testing ring, designated by general reference 7 in these Figures, which is inserted in the sealing means of the cable gland.

In effect, the test ring is inserted into the stack of annular seals of these means, as previously described.

This test ring comprises a radial bore designated by general reference 8, facing a radial hole 9 of the cable gland body, opening on same and provided with connection means to a pressure/vacuum source for testing the tightness of the cable gland.

These connection means have any suitable structure and are designated by general reference 10 in this FIG. 2, for example for cable gland 2.

The test ring may be a metal or other ring for example and the hole 9 of the cable gland body can lead transversally to same, as shown.

Thus, the connection means 10 enable the cable gland to be connected to a source of pressurized air, for example, to ensure the quality of the tightness by monitoring the development of the pressure applied to same.

For example, the cable gland tightness may be considered acceptable if there is no drop in pressure for ten minutes, for example.

Of course, other embodiments of this system may also be considered.

The invention claimed is:

1. A tightness testing system for a cable gland feed-through of a partition including a cable gland body in which a sealing system is disposed, the cable gland body including a hole, and a cable gland rammer configured to compress the sealing system, the tightness testing system comprising:
   a sealing testing ring disposed in the sealing system and provided with
      a hole opposite the hole in the cable gland body opening into the hole of the sealing testing ring, and
      a connector configured to connect to a pressure/vacuum source, enabling testing of the sealing of the cable gland.

2. The testing system according to claim 1, wherein the sealing testing ring is a metal ring.

3. The testing system according to claim 1, wherein the partition is of an immersible electrical connector.

4. The testing system according to claim 1, wherein the hole of the cable gland body has a connector at an end of the hole in the gland body.

5. The testing system according to claim 4, wherein the sealing testing ring is a metal ring.

6. The testing system according to claim 1, wherein the hole of the cable gland body opens transversely onto the cable gland body.

7. The testing system according to claim 6, wherein the hole of the cable gland body has a connector at an end of the hole in the cable gland body.

8. The testing system according to claim 6, wherein the sealing testing ring is a metal ring.

9. The testing system according to claim 1, wherein the sealing system is a deformable sleeve.

10. The testing system according to claim 9, wherein the hole of the cable gland body has a connector at an end of the hole in the cable gland body.

11. The testing system according to claim 9, wherein the sealing testing ring is a metal ring.

12. The testing system according to claim 9, wherein the hole of the cable gland body opens transversely onto the cable gland body.

13. The testing system according to claim 12, wherein the hole of the cable gland body has a connector at an end of the hole in the cable gland body.

14. The testing system according to claim 12, wherein the sealing testing ring is a metal ring.

15. The testing system according to claim 9, wherein the sealing system comprises a stack of V-shaped annular seals mounted head-to-tail one after the other, and
   wherein the sealing testing ring is disposed in the stack of annular seals.

16. The testing system according to claim 15, wherein the hole of the cable gland body has a connector at an end of the hole in the cable gland body.

17. The testing system according to claim 15, wherein the sealing testing ring is a metal ring.

18. The testing system according to claim 15, wherein the hole of the cable gland body opens transversely onto the cable gland body.

19. The testing system according to claim 18, wherein the hole of the cable gland body has a connector at an end of the hole in the cable gland body.

20. The testing system according to claim 18, wherein the sealing testing ring is a metal ring.

* * * * *